Sept. 26, 1967     W. R. BARRY     3,343,720
LIQUID DISPENSING QUANTITY SELECTOR
Filed July 6, 1965
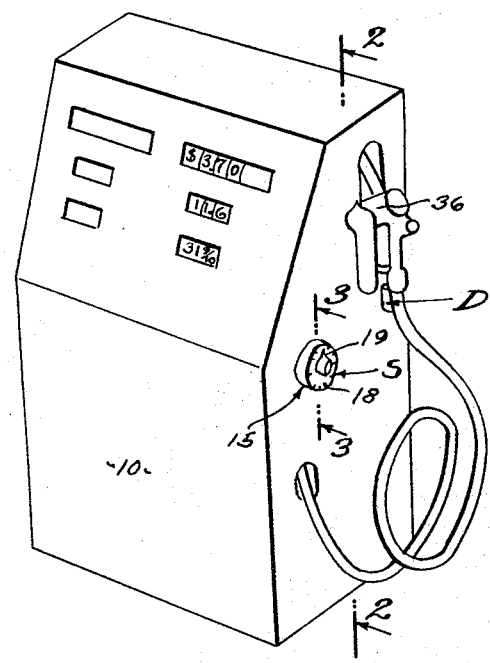
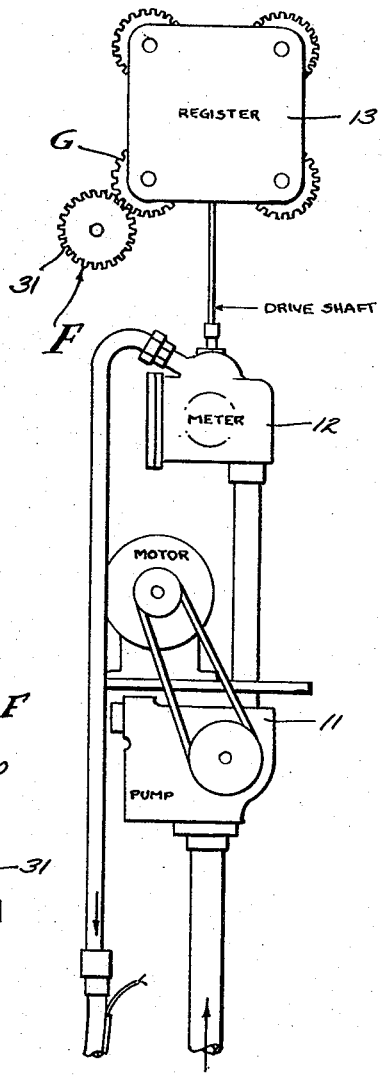
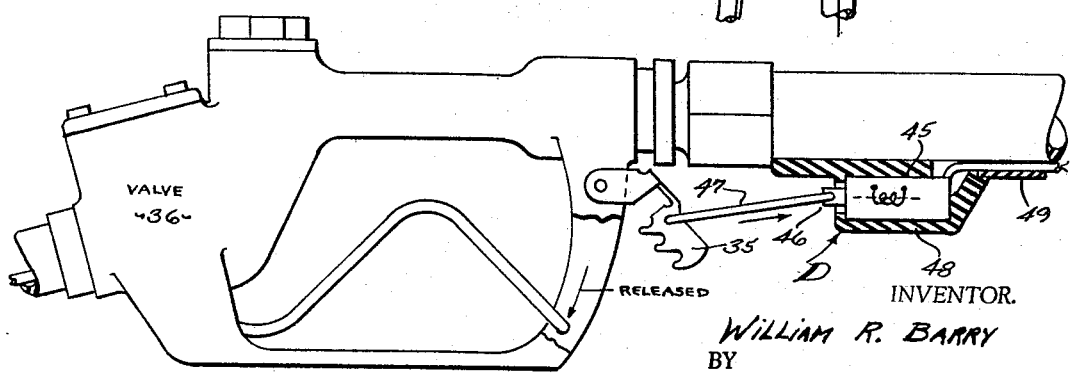
INVENTOR.
WILLIAM R. BARRY
BY
AGENT United States Patent Office 3,343,720
Patented Sept. 26, 1967

3,343,720
LIQUID DISPENSING QUANTITY SELECTOR
William R. Barry, Mission Hills, Calif.
(12657 Darla Ave., Granada Hills, Calif. 91342)
Filed July 6, 1965, Ser. No. 469,582
7 Claims. (Cl. 222—20)

ABSTRACT OF THE DISCLOSURE

This invention relates to the dispensing of liquids and namely fuel, such as gasoline and the like, and it is particularly concerned with selectivity over the amount of fuel to be dispensed, it being a general object of this invention to provide an improved quantity selector by which a person can anticipate the exact maximum quantity of liquid to be dispensed as circumstances require.

The art of fuel dispensing is the area of concern, wherein volatile liquids are delivered through pumps which are accurately metered and coordinated to liquid measurements as related to monetary measurements. That is, the usual dispensary pump includes a meter that is operable for each retail transaction to record gallons and dollars worth thereof of liquid passing through the pump. To this end, the pump includes a register that is advanced by a flow meter when liquid is dispensed, and all of which is returned to zero or a null position at the end of each retail transaction. These pumps and registers are highly accurate, as required by and controlled by law, and are not to be tampered with. Further, pumps of the type under consideration are characterized by a delivery hose and nozzle for insertion into the reservoir or tank to be filled, and the nozzle has become highly developed in that it is pressure sensitive and shuts off automatically when the said reservoir is filled. Such nozzles are well known in the art and include a pressure sensitive release or sear that trips so as to stop the control valve up on any slight obstruction of liquid flow at the tip of the nozzle. Therefore, a person in attendance to the retail transaction can devote his time to extraneous and other tasks while the reservoir or tank is being filled. However, there are frequent circumstances when the attendant dare not leave the automatic shut-off nozzle, as in the case when a customer specifies the purchase of a certain amount of liquid. If the retailer overfills the tank of a customer, it is generally considered to be the loss of the retailer and the customer's gain. Therefore, it is highly advantageous and useful to provide a quantity selector for this purpose, to predetermine and limit the maximum quantity that will be delivered by a pump and nozzle, at each operation or sale.

An object of this invention is to provide an attachment for liquid dispensing pumps and that predetermines the quantity of liquid that will be dispensed upon each initiation of operation of said pump. With the present invention a control is applied to the existing register of a pump of the type under consideration and is operable to govern the quantity of dispensation by predetermining the limit of liquid quantity in advance of initiating the dispensing action.

It is another object of this invention to provide an attachment of the character above referred to that is adapted to actuate the trip or sear of an automatic dispensing nozzle, to shut off the liquid flow when a predetermined maximum quantity of liquid has been delivered therethrough. With the present invention the attachment to the register of the pump is combined with an attachment to the dispensing nozzle, to instantly stop the liquid flow upon reaching a predetermined and selected quantity.

It is still another object of this invention to provide a highly utilitarian device of the simplest form, whereby the application thereof to liquid dispensing pumps can be accomplished with minimum expense and as well in a practical and efficient mode of application, all of which is operable with safety.

The various objects and features of this invention will be fully understood from the following detailed description of the typical preferred form and application thereof, throughout which description reference is made to the accompanying drawings, in which:

FIG. 1 is a perspective view illustrating the illustration of the liquid dispensing quantity selector of the present invention. FIG. 2 is a detailed view of the pump meter and register structure to which the quantity selector of the present invention is applied, being a view taken substantially as indicated by line 2—2 on FIG. 1. FIG. 3 is a view of the quantity selector as taken by line 3—3 on FIG. 1, and FIG. 4 is a sectional view taken as indicated by line 4—4 on FIG. 3. FIG. 5 is a side view with parts shown in section, showing the nozzle and the quantity limiting actuator of the present invention applied thereto.

In the drawings I have shown a typical pump for the dispensing of gasoline and which involves a stand 10 that houses the pump unit 11, the meter 12 and the register 13. The pump, in general, is usual in every respect and can vary widely according to the various manners in which they are arranged. However, a feature of similarity that characterizes all such pumps is the register 13 with its basic quantity monetary indicator, regardless of what monetary system is used. For example, the domestic dollar is divided into tenths and one hundredths, and a purchaser will most always buy quantities of liquid fuel based upon his buying ability. Therefore, most often a buyer specifies the quantity to be purchased in terms of value, dollar and cent value. It is to be understood, however, that volume or liquid measurement can be used as the basis of control if so desired. In the drawings I have shown the typical pump arrangement wherein the register 13 is driven by operation of the meter 12 when liquid flows through the pump unit 11, there being a driving gear G at the side of the register 13 and which revolves one complete revolution for each one dollar expenditure involved. Further, the register has a return means, usually a crank C, that is manually operated to return the register to a zero or null value.

In accordance with the invention I provide a quantity preselecting means S, a quantity following means F, and a quantity determining means D, all associated intimately with the pump P. The means S, F and D are combined as a unit in the form of an attachment to be applied to or within the pump stand 10. The preselecting means S is manually operable to predetermine a quantity of liquid desired to be delivered. The quantity following means F is operable to be driven by a register 13, as by the driving gear G thereof, or any other suitable moving part thereof, and the quantity determining means D is operable to terminate delivery of liquid from a pump 11 when the quantity following means F reaches the manual setting of the means S.

The means S, F and D are contained within a housing 15 that is adapted to be fastened to the pump stand 10 preferably within the confines thereof. In order to gain adjustment access to the mechanism involved, the shell-like stand is provided with a single opening 16 to pass a control shaft 17, there being a dial 18 and selector 19 at the exterior of the stand 10. It is preferred, therefore, that the housing be a sectional construction, with an inside half 20 installed within the stand 10 and with the dial 18 comprising the outside half installed at the exterior of the stand. Generally, it is the exterior half or dial 18 which accommodates the elements of the quantity preselecting means S, while it is the interior half 20 which accommodates the elements of the quantity following means F. The quantity sensing portion of the quantity delivering means D is also located within the housing 15, where it correlates the functions of the two means S and F.

The quantity preselecting means S that is manually operable to predetermine the quantity of liquid to be delivered is associated with the dial 18. The said dial 18 overlies the opening 16 in the stand 10, on an axis coincidental with that of the opening, the dial 18 being a circular plate-like element secured to the surface of the stand. In accordance with the invention the dial 18 has a face 21 in a plane normal to the said axis, and the face is incrementally marked off with a circular series of indicia 22. In this instance the indicia is dollars and fractions of dollars, within the range of ten dollars. It is preferred that the readable indicia 22 be in even dollars and half dollars, and at each indicia there is an indentation in the face 21. Also, the intermediate quarter dollar indent is provided without indicia, it being understood that finer increments can be provided if so desired.

The control shaft 17 is sectional with an adjustment section 23 journaled in the dial 18 and with a transmission section journaled in the housing half 20. The shaft section 23 is free to turn relative to the dial 18 and carries a manually engageable control knob 24 at the exterior of the face 21. The control knob 24 is characterized by a pointer 25 that extends radially to the indicia 22 and/or indentations above referred to, there being a biased element 26 as part of or carried by the pointer 25 to releasably engage with each indentation. In other words, the biased element 26 and the said indentations comprise a detent means to positively and accurately position the knob and attached shaft section. Thus, the knob 24 can be manually set, as circumstances require, to any indicia or fractional position where an indentation is provided, the shaft representing the rotational position of the pointer 25.

The quantity following means F that is operable to be driven by the register 13, or a like drive means, is associated with the housing half 20. The said housing half 20 underlies the opening 16 within the stand 10, also on an axis coincidental with that of the opening. In accordance with the invention the housing half 20 journals the transmission shaft section 30 coincidentally with the axis of the above mentioned shaft section 23. The shaft section 30 is geared directly to the driving gear G, as by pulleys or gears as shown, and preferably by means of a counter shaft and drive gear 31 so that it follows accurately the advancement and retraction of the said gear G. That is, the shaft section 30 follows precisely any rotational movement of the said gear G. In the case illustrated the gear ratio between gear G and shaft section 30 is ten to one as must be the case when the dollar gear G, above described, is related to the dial 18 which is divided into ten equal dollar increments. In accordance with the invention the shaft sections 23 and 30 are juxtapositioned and are free to turn independently of each other.

The quantity determining means D that is operable to terminate delivery of liquid correlates the functions of the two above described means S and F. That is, the quantity determining means D is operable to sense the relative functions of the means S and F and is operable to trip the sear 35 of the nozzle N. Therefore, the means D involves generally a quantity limiting sensor 40 and a quantity limiting actuator 45 associated with the control unit S–F–D and nozzle N respectively. It is the nozzle N with its valve 36 controlled by the sear 35 by means of mechanism sensitive to back-up pressure against the nozzle tip that is relied upon to shut off liquid flow from the pump unit 11, this being the usual and acceptable mode of flow control. In accordance with the invention it is the sear 35 which is actuated to effect liquid flow stoppage, the sear 35 being an exposed part of lever configuration and which is readily revolved with minimum of applied force to cause tripping action. Tripping action of the sear is immediately followed by automatic closing of the valve 36.

The quantity limiting sensor 40 can vary in form, for instance it can be mechanical or pneumatic or hydraulic, and in its preferred form it is electrical. A unique feature of the sensor 40 is the fixed location of the switch 41 that is operated upon by the movable cam 42. The cam 42 projects from the shaft 23 so that the position of the pointer 25 is reflected in the position of the cam 42. In accordance with the invention, the sensor 40 is made operable by and it includes an overriding drive 50 between the shaft sections 23 and 30. The overriding drive 50 is operable to permit manual advancement of the control knob 24 in relation to the position of shaft section 30, and is operable to reversely drive the said control knob 24 from the said shaft section 30. A unique overriding drive 50 is shown wherein a helical spring is fixed to one shaft section and frictionally embraces the other shaft section that is juxtapositioned thereto. When the fixed-to section is revolved in one direction the spring will open or expand in diameter so as to release the other shaft section, and when it is revolved in the other direction the spring will close or constrict in diameter so as to grip the other shaft section. Thus, the overriding drive 50 couples the juxtapositioned shaft sections to drive the section 23 counter-clockwise toward the zero or null position, and frees the shaft sections to permit clockwise setting of the section 23 and knob 24 carried thereby. The switch 41 is operable to close a circuit when the knob pointer 25 is at the zero or null position.

The quantity limiting actuator 45 is preferably an electrical motor device and is shown as a solenoid wherein the plunger 46 is coupled to the sear 35 by a link 47. As is pointed out above, the sear 35 is a lever-like part that revolves and the link 47 is pivotally coupled to the sear to pull and thereby trip the same when the plunger 46 is reciprocated by energizing the solenoid. The solenoid plunger 46 and link 47 are free to reciprocate and do not require a return means. In carrying out the invention, the solenoid is encased within a plastic or rubber-like enclosure 48 that wraps onto the hose or base of the nozzle end. The energizing circuit to the switch 41 is also encased within a plastic or rubber-like enclosure that extends along the hose H, intermediate the switch 41 and solenoid actuator 45. The enclosures 48 and 49 are secured to the nozzle and hose by means of an adhesive and with the complete absence of exposed metallic parts. As shown, the solenoid actuator 45 is rather small and the sear 35 requires but a limited travel, all to the end that the nozzle N and hose H are not unnecessarily encumbered.

From the foregoing it will be apparent that few parts and elements are required in the construction of this liquid dispensing quantity selector. Furthermore, the operation thereof is simple and foolproof. The drive gear G is followed precisely by the quantity following means F, to advance with advancement of the gear G and to retract with retraction of the gear G. As is above described, the quantity preselecting means S is operable to permit initial advancement of the pointer 25 to the exact position of any desired detent position representing a quantity, and the quantity following means F as it is related to the quantity preselecting means S by the quantity determining means D is operable to drive the shaft section 23 relative to the cam 42 toward a zero or null position where the switch 41 is operated to actuate the solenoid actuator 45 and thereby tripping the sear 35. After each operation of the pump unit 11 the register 13 is reset as by means of the crank C, and in order to initiate the reset following dispensing action it is merely necessary to advance the pointer 25 to the value or quantity desired, whereupon the pump is again operable to dispense an exact quantity.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A liquid dispensing quantity selector for a meter controlled pump unit having a quantity register and a nozzle valve adapted to be tripped to a closed position, and including:
   (a) a manually settable quantity preselecting means mounted adjacent said register;
   (b) a quantity following means mounted to and driven with said register;
   (c) an overriding coupling means connecting the first two mentioned means for free advancement of the first mentioned means and driving retraction thereof;
   (d) and a quantity determining means responsive to retraction of the first mentioned means from the manually set position to a null position and thereat to trip said valve to a closed position.

2. A liquid dispensing quantity selector for a meter controlled pump unit having a quantity register and a nozzle valve adapted to be tripped to a closed position, and including:
   (a) a manually settable quantity preselecting means adjacent said register and having a rotatably operable shaft;
   (b) a quantity following means mounted to and having a rotatable shaft driven with said register;
   (c) an overriding coupling means connecting the shafts of the first two mentioned means, for free advancement of the shaft of the first mentioned means and driving rotative retraction thereof;
   (d) and a quantity determining means responsive to rotative retraction of the shaft of the first mentioned means from the manually set position to a null position and thereat to trip said valve to a closed position.

3. A liquid dispensing quantity selector for a meter controlled pump having a quantity register with a drive gear and a nozzle valve adapted to be tripped to a closed position, and including:
   (a) a manually settable quantity preselecting means mounted adjacent said register and having a reversely rotatable shaft;
   (b) a quantity following means mounted to and having a gear engaged with the first mentioned gear to revolve a shaft with said register;
   (c) an overriding coupling means connecting the shafts of the first two mentioned means, for free advancement of the shaft of the first mentioned means and driving retraction thereof;
   (d) and a quantity determining means responsive to the rotative retraction of the shaft of the first mentioned means from the manually set position to a null position and thereat to trip said valve to a closed position.

4. A liquid dispensing quantity selector for a meter controlled pump unit having a quantity register housed within a shell-like stand and a nozzle valve adapted to be tripped to a closed position, and including:
   (a) the shell-like stand having an opening formed therein;
   (b) a manually settable quantity preselecting means mounted onto the exterior of the shell-like stand, at said opening therein;
   (c) a quantity following means mounted within the shell-like stand, at said opening, and driven with said register;
   (d) an overriding coupling means extending through the said opening and connecting the first two mentioned means for free advancement of the first mentioned means and driving retraction thereof;
   (e) and a quantity determining means responsive to the manually set position of the first mentioned means from the manually set position to a null position and including means to trip said valve to a closed position.

5. A liquid dispensing quantity selector for a meter controlled pump unit having a quantity register with a drive housed within a shell-like stand and a nozzle valve adapted to be tripped to a closed position, and including:
   (a) the shell-like stand having an opening formed therein;
   (b) a manually settable quantity preselecting means mounted onto the exterior of the shell-like stand, with a rotating shaft aligned with said opening;
   (c) a quantity following means mounted within the shell-like stand, with a rotating shaft aligned with said opening and driven by the drive of the said register;
   (d) an overriding coupling means extending through the said opening and revolvably connecting the shafts of the first two mentioned means for free advancement of the first mentioned means and driving retraction thereof;
   (e) and a quantity determining means responsive to the manualy set position of the first mentioned means from the manually set position to a null position and including means to trip said valve to a closed position.

6. A liquid dispensing quantity selector for a meter controlled pump unit having a quantity register with a drive gear housed within a shell-like stand and a nozzle valve adapted to be tripped to a closed position, and including:
   (a) a shell-like stand having an opening formed therein;
   (b) a manually settable quantity preselecting means mounted onto the exterior of the shell-like stand, with a rotating shaft aligned with said opening;
   (c) a quantity following means mounted within the shell-like stand, with a rotating shaft aligned with said opening and with a gear engageably driven with the said drive gear of the register;
   (d) an overriding coupling means extending through the said opening and engageable upon advancement of the rotative position of the second mentioned shaft to revolvably retract the rotative position of the first mentioned shaft, and disengageable upon opposite rotation;
   (e) and a quantity determining means responsive to rotative retraction of the first mentioned shaft to a manually set null position of the first mentioned means and including means to trip said valve to a closed position.

7. A liquid dispensing quantity selector as set forth in claim 6, wherein:
   the quantity preselecting means has a cam carried by the first mentioned shaft and advanced relative to a dial;
   and the quantity determining means has a quantity limiting sensor responsive to rotative retraction of the cam to a manually set null position by the quantity following means, and a quantity limiting actuator activated by arrival of the said cam at the said null position to operate the sear to trip said valve to a closed position.

References Cited

UNITED STATES PATENTS

| | | | |
|---|---|---|---|
| 1,996,944 | 4/1935 | Witter | 222—15 |
| 2,784,874 | 3/1957 | Harper | 222—19 X |
| 2,804,991 | 9/1957 | Burleyson | 222—20 |
| 3,079,045 | 2/1963 | Kimball et al. | 222—76 X |
| 3,138,289 | 6/1964 | Jones et al. | 222—20 |
| 3,199,727 | 8/1965 | Romanowski | 222—20 |
| 3,260,409 | 7/1966 | Benham | 222—23 X |

ROBERT B. REEVES, *Primary Examiner.*

S. H. TOLLBERG, *Assistant Examiner.*